(12) United States Patent
Olschimke et al.

(10) Patent No.: US 8,288,285 B2
(45) Date of Patent: Oct. 16, 2012

(54) REVERSIBLE WATER-FREE PROCESS FOR THE SEPARATION OF ACID-CONTAINING GAS MIXTURES

(75) Inventors: Jens Olschimke, Hannover (DE); Carsten Brosch, Seelze (DE); Andreas Grossmann, Sehnde (DE)

(73) Assignee: Solvay Fluor GmbH, Hannover (DE)

( * ) Notice: Subject to any disclaimer, the term of this patent is extended or adjusted under 35 U.S.C. 154(b) by 0 days.

(21) Appl. No.: 13/078,060

(22) Filed: Apr. 1, 2011

(65) Prior Publication Data

US 2011/0177693 A1 Jul. 21, 2011

Related U.S. Application Data

(62) Division of application No. 12/298,277, filed as application No. PCT/EP2007/054043 on Apr. 25, 2007.

(30) Foreign Application Priority Data

Apr. 27, 2006 (EP) ..................................... 06008713

(51) Int. Cl.
H01L 21/302 (2006.01)
H01L 21/461 (2006.01)

(52) U.S. Cl. .......................... 438/706; 438/707; 438/714

(58) Field of Classification Search .......................... None
See application file for complete search history.

(56) References Cited

U.S. PATENT DOCUMENTS

| | | | |
|---|---|---|---|
| 3,253,029 A | 5/1966 | Fawcett | |
| 4,092,403 A | 5/1978 | Rectenwald et al. | |
| 4,183,903 A | 1/1980 | Melchior et al. | |
| 6,489,510 B1 | 12/2002 | Braun et al. | |
| 6,525,213 B1 | 2/2003 | Braun et al. | |
| 6,579,343 B2 | 6/2003 | Brennecke et al. | |
| 7,396,381 B2 | 7/2008 | Graham et al. | |
| 7,404,846 B2 | 7/2008 | Golden et al. | |
| 2002/0189444 A1 | 12/2002 | Brennecke et al. | |
| 2003/0204041 A1 | 10/2003 | Laas et al. | |
| 2004/0035293 A1 | 2/2004 | Davis, Jr. | |
| 2004/0133058 A1 | 7/2004 | Arlt et al. | |
| 2004/0158100 A1* | 8/2004 | Irie et al. | ....................... 562/849 |
| 2005/0271568 A1* | 12/2005 | Mori et al. | .................. 423/240 S |
| 2007/0084344 A1 | 4/2007 | Moriya et al. | |
| 2007/0119302 A1 | 5/2007 | Radosz et al. | |
| 2007/0197826 A1 | 8/2007 | Braun et al. | |
| 2007/0293707 A1 | 12/2007 | Wolfert et al. | |
| 2009/0211449 A1* | 8/2009 | Olschimke et al. | ............. 95/233 |

FOREIGN PATENT DOCUMENTS

| | | |
|---|---|---|
| DE | 10114565 A1 | 9/2002 |
| DE | 10355696 A1 | 6/2005 |
| EP | 1394109 A1 | 3/2004 |
| JP | 20060305544 A | 10/2006 |
| JP | 20060272143 A | 12/2006 |
| WO | WO 020074718 A2 | 9/2002 |
| WO | WO 20050007657 A2 | 1/2005 |
| WO | WO20050085129 A2 | 9/2005 |
| WO | WO 20060029788 A1 | 3/2006 |
| WO | WO 20060045518 A1 | 5/2006 |

OTHER PUBLICATIONS

U.S. Appl. No. 11/66,581, filed Mar. 6, 2009, Jens Olschimke et al.
U.S. Appl. No. 10/591,783, filed Dec. 6, 2006, Max Josef Braun, et al.
P. Wasserscheid et al., Angew. Chem. 2000, 112, pp. 3926-3945 (20 p.).
P. Wasserscheid et al., "Ionic Liquids—New "solutions" for Transition Metal Catalysis", Angew. Chem. Int. Ed., pp. 3772-3789 (18 p.)—English translation , 2000.
C. Reichardt, Section 7.4, "Empirical Parameters of Solvent Polarity from Spectroscopic Measurements", in: Solvent Effects in Organic Chemistry, Verlag Chemie, Weinheim, New York, 1979, pp. 237-250 (15 p.).
M. Yoshizawa et al., "Novel Polymer Electrolytes Prepared by Copolymerization of Ionic Liquid Monomers", Polym. Adv. Tech.13 (2002), pp. 589 to 594 (6 p.).
S. H. Strauss, "The search for larger and more weakly coordinating anions", Chem. Rev., 1993, vol. 93, pp. 927-942 (16 p.).
E. J. Angueira et al., "Predicting the composition of acidic, ionic liquids in contact with HCl gas", AICHE Journal, vol. 51(10), Oct. 2005, pp. 2778-2785 (8 p.).
PCT International Search Report dated Sep. 5, 2007 for International Application No. PCT/EP2007/054043; (3 p.).
[Unknown Author] —"Technical Summaries on Ionic Liquids in Chemical Processing", pp. 1-30 (Aug. 22, 2003), accessible online at www.chemicalvision2020.org/pdfs/tech_summary.pdf, accessed on Feb. 12, 2010.

* cited by examiner

Primary Examiner — Duy Deo
(74) Attorney, Agent, or Firm — Beatrice C. Ortego

(57) ABSTRACT

Gas mixtures which comprise acids like HF, HCl or HBr and other constituents, especially gas mixtures which comprise or consist of carboxylic acid fluorides, $C(O)F_2$ or phosphorous pentafluoride and HCl and optionally HF, can be separated by ionic liquids. The process is performed reversibly. Ionic liquids are applied the anion of which corresponds to a stronger acid than the acid to be removed. Highly purified products, for example, highly purified carbonyl fluoride can be obtained.

15 Claims, No Drawings

US 8,288,285 B2

REVERSIBLE WATER-FREE PROCESS FOR THE SEPARATION OF ACID-CONTAINING GAS MIXTURES

This application is a divisional of U.S. application Ser. No. 12/298,277, which is a national stage entry under 35 U.S.C. §371 of International Application No. PCT/EP2007/054043, filed Apr. 25, 2007, which claims priority to European Application No. 06008713.7, filed Apr. 27, 2006, these applications being herein incorporated by reference in their entirety for all purposes.

The invention relates to a reversible process for the separation of gas mixtures which comprise an acid like HCl, HF and/or HBr as well as other constituents, by means of ionic liquids. Especially, it provides for the reversible separation of such mixtures which comprise $C(O)F_2$, phosphorus pentafluoride or certain acid fluorides and HCl and optionally HF.

In many chemical reactions, HCl, HF or HBr, sometimes two or all three compounds are involved, be it as starting material, as reaction product or as product of a side reaction. Often, these acids can be removed from respective gas mixtures by absorbents, for example, amines. A disadvantage is that the amine-hydrohalide adducts have to be dumped or burned. Sometimes, other constituents of the gas mixture may be sensitive towards or reactive with bases. In some gas mixtures, the boiling points of the constituents may be so close that distillation is no successful approach to remove HCl or other acids.

Organic gaseous acid fluorides like $CF_3C(O)F$ or $CHF_2C(O)F$ are starting compounds for fluorinated organic compounds, for example for fluorovinyl ethers which in turn are comonomers for resins or elastomers. $CH_3C(O)F$ was proposed as a pesticide. Acid fluorides may contain HCl or HBr depending on the method for their preparation, sometimes, additionally also HF.

Phosphorous pentafluoride is an intermediate for the preparation of electrolyte salts for lithium ion batteries. For example, it can be reacted with lithium fluoride to form lithium hexafluorophosphate. Phosphorous pentafluoride can be prepared from phosphorous pentachloride or phosphorous trichloride and chlorine and hydrogen fluoride. HCl is formed in this reaction and must be separated off from phosphorous pentafluoride.

Carbonyl fluoride has been proposed as new etching gas for semiconductor manufacture and for cleaning of CVD chambers. International patent application WO 05/085129 discloses a photochemical process for the manufacture of $C(O)F_2$ from $CHClF_2$. The process described therein provides for the preparation of $C(O)F_2$ by photooxidation of $CHClF_2$ with oxygen. Light which does not have a single wavelength but instead has a spectral range covering at least 50 nm (this means that the light having the shortest wavelength and the light with the longest wavelength are at least 50 nm apart) is radiated in.

Mixtures which comprise HF may be, for example, result of a fluorination reaction with hydrogen fluoride or fluorine. For example, carboxylic fluorides can be prepared by the reaction of carboxylic acid chlorides and HF or photochemically (U.S. Pat. No. 6,489,510). Such mixtures usually also comprise HCl. Beside the difficult separation concerning specifically mixtures comprising HCl/carboxylic acid fluoride, HF/carboxylic acid fluoride, HF/HCl/carboxylic acid fluoride, $HCl/PF_5$ and $HCl/C(O)F_2$, respectively, it is generally desirable to separate HF, HCl or HBr from gas mixtures comprising HF, HCl and/or HBr and other constituents or to separate these gas mixtures so that gas mixtures or pure gases are obtained which are depleted in HF, HCl and HBr, respectively, and in which the other constituent or other constituents are thus concentrated. Further, it can be desirable to remove the acid from the gas mixtures mentioned above under water-free conditions, for example, to prevent corrosion damages in an apparatus or to reduce the amount of contaminated washer water used for acid removal.

International patent application PCT/EP 05/011267 discloses a process for the removal of HCl, HF or HBr from mixtures with $C(O)F_2$, $PF_5$ or carboxylic acid fluorides by means of ionic liquids. Several ionic liquids are disclosed as suitable separating agent. No mention is made of performing the absorption reversibly and to recover the ionic liquid unchanged or to perform absorption/desorption continuously. In some examples, the HCl separated is desorbed from the ionic liquid, which nevertheless is not recycled.

European patent application EP-A 1 394 109 discloses a process for the separation of HF and similar acids from acid fluorides. Heteroaromatic compounds with a boiling point of at least 50° C. which contain nitrogen as hetoatom or heteroatoms are recommended as deacidificating agent. As can be seen from the description of that patent application, these heteroaromatic compounds are amines (amines have an appreciable vapor pressure at temperatures below 100° C.) such as imidazole or pyridine or respective ion exchanger resins with amino groups like the pyridine or imidazole group. Polyvinyl-(4-pyridine) and polyvinyl-(2-pyridine) are given as examples. Ionic liquids are not applied; the compounds used in that EP patent application comprise free amino groups.

International patent application WO 02/074718 discloses ionic liquids as selective additives for the separation of mixtures with a close boiling point or of azeotropic mixtures. These mixtures are liquids or condensed gases, i.e., the separation is a liquid-liquid separation. Mixtures which are to be separated are mixtures of water and amines, tetrahydrofurane, formic acid, alcohols, acetates, acrylates, acetic acid, mixtures of acetone and methanol or close-boiling mixtures such as C4 or C3 hydrocarbons or mixtures of alkanes and alkenes. Thus, purely organic mixtures, often of compounds with at least 3 carbon atoms, are concerned, or mixtures which comprise water.

US patent application 2004/0035293 discloses ionic liquids which comprise a substituent with properties of a Broensted acid, for example, a sulfonic acid group. Such ionic liquids can be applied for gas separation, for example, for separating off $CO_2$ or COS, for separating off alkenes, alkynes or CO or for catalysis.

US patent application 2002/018944 (=U.S. Pat. No. 6,579,343) discloses a process for gas purification by means of ionic liquids. For example, water, $CO_2$, oxygen and the like can be separated from gas mixtures. In this manner, natural gas, air or nitrogen can be purified.

It is an object of the present invention to provide a simple process with which acids, especially protic acids, for example HF, HCl or HBr can be removed from gas mixtures reversibly by means of ionic liquids whereby a gas mixture or gas is obtained which is depleted in acid, and whereby the ionic liquid is reused.

A preferred object of the present invention is to provide such a process with which $C(O)F_2$, phosphorous pentafluoride or carbonic acid fluoride depleted in HCl, HF or HBr can be obtained, from mixtures which comprise $C(O)F_2$, phosphorous pentafluoride or carboxylic acid fluorides and HCl, HF or HBr, or with which said fluorides can be concentrated. Another object of the present invention is to provide especially C(O)F$_2$, but also phosphorous pentafluoride with a very low HCl content. These and other objects are achieved by the present invention.

The process according to the present invention for separating off acids from gas mixtures which comprise acid or acids and one or more of other gaseous constituents comprises contacting these gas mixtures in an absorption step with one or more ionic liquids which reversibly absorb the acid or acids preferentially than other constituents of the gas mixture, then, after contacting the gas mixture with the ionic liquid, in a desorption step, the absorbed acid is removed from the ionic liquid, and after desorption, the recovered ionic liquid is applied in another absorption step to separate acid or acids from the gas mixtures, with the proviso that an ionic liquid is used whose protonated anion corresponds to an acid which is stronger than the acid or acids to be absorbed.

The inventors found that the acid is reversibly absorbed in the ionic liquid if according to the proviso, the anion of the ionic liquid corresponds to a stronger acid than the acid to be absorbed. Consequently, after desorption of the reversibly absorbed acid, the ionic liquid is used again for acid removal (or could even be used for other purposes). For example, the sequence of absorption step and desorption step is performed twice, or more often, for example, three times, four times or five times. The number of sequences of absorption and desorption is dependent of the content of impurities in the raw gas mixture and of the degree of desired depletion. Especially preferably, the steps of absorption and desorption is performed still more often, fifty times, hundred times and more. The process can be performed continuously in two or more reactors one or several of which are used for absorption, the second one or the rest of the others, respectively, is used for desorption.

In the process of the present invention, the gas mixture leaving the absorption step is passed in one or more further steps through ionic liquid. In the process of the present invention, the proviso that an ionic liquid is used whose protonated anion corresponds to an acid which is stronger than the acid or acids to be absorbed is applied in the first absorption step and also in the further absorption steps.

In one alternative of this embodiment, the gas mixture which was already contacted with the ionic liquid is again contacted with the recycled ionic liquid to further deplete the content of acid, for example, HCl.

According to this alternative of the process of the present invention, the sequences of absorption and desorption can be performed with the same gas mixture. Here, the gas mixture will be more and more depleted from the acid, e.g., HCl, which is contained. The intermediate desorption of the acid entrained provides for the removal of the respective content of the acid still contained in the gas mixture leaving the respective absorption steps. In this embodiment, the gas mixture is treated in several absorption steps, and the ionic liquid is recycled several times.

In another alternative, raw gas which was not yet treated with an ionic liquid is treated with the recycled ionic liquid. According to this alternative of the process of the present invention, fresh gas mixture is treated in the absorption step, the ionic liquid is desorbed from acid, then again, fresh gas mixture is treated, and afterwards, again desorption is performed. In this embodiment, the gas mixture is treated only in one absorption step, but the ionic liquid is applied two or more times after desorption.

Thus, according to the process of the invention, the raw gas mixture can be treated two or three or more times with ionic liquid. The examples demonstrate that even with a carbonyl fluoride/HCl raw gas mixture which comprises more than 40% by of HCl, carbonyl fluoride with an HCl content of less than 15 ppm can be obtained.

If desired, the absorption can be performed in two or more consecutive absorption steps. The ionic liquid of the consecutive absorption steps can then be treated together, by applying vacuum to them and/or applying heat, in a desorption step to remove entrained acid. The desorbed ionic liquid is then recycled to the absorption apparatus, and further gas mixture is then treated.

The absorption treatment can be performed in common apparatus used for gas-liquid contact, if desired, in counterflow reactors.

If, contrary to the invention, ionic liquids are applied with anions that correspond to acids which are weaker than the acid to be separated, then the anion is formed from the acid which is to be separated, while the anion of the ionic liquid is protonated. Depending on the equilibrium and solubility product of the ion pair formed from the cation of the ionic liquid and the formed anion, the ion pair either precipitates or remains in solution but without absorptive effectivity.

No water is added, and preferably, the ionic liquid is essentially water-free (for example, less than 0.1% by weight), so that any possible hydrolytic reaction takes place only in minor amount, if at all.

In the process of the present invention, ionic liquids are added from the start.

Generally, the inventive process can be applied to any gas mixture from which the acidic constituent shall be removed in a water-free process. In the gas mixtures to be treated preferably only compounds are comprised with a boiling point below 50° C. at normal pressure, and which preferably are gases at normal conditions (25° C., 1 bar abs.), for example, trifluoroacetyl fluoride, difluoroacetyl fluoride, PF$_S$, C(O)F$_2$ and as acids, HCl, HF, or HBr.

While the above mentioned gas mixtures represent a preferred embodiment, the process of the present invention can be applied to many more acid-containing gas mixtures.

For example, it also can be applied to gas mixtures which comprise HCl and diazomethane, HCl and hydrocarbons, for example, cyclopropane, 1,3-butadiene, 2-methylpropene, acethylene, butane, pentane, but-1-ene, methane, propene, propadiene, ethane, ethene, propane, 2-methylpropane, 2,2,-dimethylpropane, oxygen containing organic compounds, for example, acetaldehyde, 1,1,1,3,3,3-hexafluoropropane-2-one, ketene, methanethiol, trifluoromethanethiol, perfluoromethylperoxofluoroformiate, trifluoroethylene, carbonyl and thiocarbonyl halides, for example, carbonyl dichloride, thiocarbonyl fluoride, thiocarbonyl chloride fluoride, bromomethane, 2-chloropropene, chloromethane, cis-1-chloro-2-fluoroethene, trans-1-chloro-2-fluoroethene, HCl and silyl compounds, for example, trimethylsilane, dichlorodimethylsilane, and halogenated hydrocarbons, for example, difluoromethane, chloroethane, 1,2-difluoroethane, trifluoromethane, chlorodifluoromethane, 1,1,1-trifluoroethane, fluoroethene, fluoroethyne, chloroethyne, 1-chloro-1,1-difluoroethane, chlorotrifluoromethane, dichlorodifluoromethane, 1,1,1,2-tetrafluoroethane, 2-chloro-1,1,1-trifluoroethane, 1,1-difluoroethene, 1-chloro-1-fluoroethene, 1,2-difluoroethene, 2-chloro-1,1-difluoroethene, 1-chloro-1,2-difluoroethene, 1,2-dichloro-1,1,2,2-tetrafluoroethane, chloro-trifluoroethene, 1,2-dichloro-1,2-difluoroethene, 2-chloro-1,1,1,2-tetrafluoroethane, and other organic compounds, for example, nitrous acid methyl ester or formyl fluoride.

The process can also be applied to other gas mixtures comprising HF and organic compounds, for example, gas mixtures comprising HF and hexafluoropropylene oxide, trifluoroethylene, hexafluoroacetone, acethylene, trifluoromethylhypofluorite ($CF_3OF$). difluorobromomethane, carbonyldifluoride, heptafluoropropane, hexafluoroethylene, cis- and trans-1-chloro-2-fluoroethylene, fluoromethane, difluoromethane, fluoroethane, chlorofluoromethane, 1,2-difluoroethane, and 1,2-cis- and trans-difluoroethylene.

The process can also be applied to other gas mixtures comprising HBr and oranic compounds, for example, gas mixtures comprising HBr and butadiene, hexafluoroacetone, 2-methylprpene, acethylene, heptafluoropropane, methylsilane, dimethylsilane, trifluoromethane, chloroethane, trimethylbromosilane, trifluorobromomeethane, and 2-bromo-heptafluoropropane.

The process can be applied very advantageously for gas mixtures where the boiling points of the target compound and at least one of the further constituents to be separated off do not differ by more than 20° C.; among the constituents with the closest boiling point to the target compound, preferably the acid to be separated off is included. Preferably, the acid to be removed is the constituent with the closest boiling point to the target compound.

The process is especially suitable for the separation of HCl and will be further explained in view of this embodiment.

For example, the process is suitable for gas mixtures which comprise HCl and compounds with a boiling point of below 50° C. at ambient pressure (1 bar abs), preferably compounds which are gaseous at normal conditions (25° C., 1 bar abs), for example, carboxylic acid chlorides like trifluoroacetyl chloride (TFAC) or difluoroacetyl chloride (DFAC). It also can be applied to remove HCl from carboxylic acid fluorides which are gaseous at normal conditions, especially from difluoroacetyl fluoride, trifluoroacetyl fluoride, $C_2F_5C(O)F$ or $CH_3C(O)F$. It is also applicable for gas mixtures comprising HBr and other constituents. Preferably it is applied for the purification of carbonyl fluoride or carboxylic acid chlorides and carboxylic acid fluorides with at most 3 carbon atoms. If HF is comprised, it is removed, too.

While some processes according to the state of the art provide for the separation of liquid components or condensed gases, in the process of the present invention, preferably a gas mixture is separated which is contacted with the ionic liquid in a gaseous state, thus, is not contacted with the ionic liquid in a condensed state.

The process is especially suited for the separation of HCl and optionally HF from $C(O)F_2$, $CHF_2C(O)F$, $CF_3C(O)F$ and $PF_5$. Especially preferably, carbonyl fluoride is treated.

The term "ionic liquid" is understood to denote ionic liquids as defined by Wasserscheid and Keim in Angewandte Chemie 2000, volume 112, pages 3926-3945. Ionic liquids are for example suitable as solvents. As explained in that publication, ionic liquids are salts with relatively low melting point with nonmolecular, ionic character. They are liquid already at relatively low temperatures, for example, <100° C., with a relatively low viscosity. They have a very good solubility for a great range of organic, inorganic and polymer substances. In the frame of the present invention, ionic liquids preferably are liquid below 50° C., especially preferably below 25° C. (at normal pressure).

Generally, ionic liquids are non-flammable, non-corrosive, have a low viscosity and are characterized by a non-detectable vapor pressure.

The ions of ionic liquids applicable in the present invention may have one or more positive or negative charges; ions with one positive and one negative charge, respectively, are preferred. Similar treatment is performed if constituents of the gas mixture are sensitive towards oxygen.

Ionic liquids which are suitable for the separation of mixed compounds are described in WO 02/074718. They are based on ionic liquids comprising ammonium, guanidinium or phosphonium ions in the cations. Generally, the ionic liquids are selected such that they do not react chemically with a component of the gas mixture to be separated causing thereby to decomposition. This can be ascertained by simple tests. If the gas mixture comprises constituents which are sensitive towards moisture, it is advisable to essentially exclude moisture, for example, by means of drying agents in the reactor, flushing with dry inert gas or similar treatments.

In the frame of the present invention, cations are preferred which contain nitrogen. In the following, suitable cations and anions are explained in detail; it is clear for the expert that the respective pair of cations and anions must result in a product which must be liquid at a temperature of not higher than 100° C. (i.e. with a melting point equal to or lower than 100° C.) to be a useful ionic liquid. Especially preferably are ionic liquids which are liquid at ambient temperature (about 20° C.) and ambient pressure (1 bar abs).

Phosphorous containing cations which are suitable, especially phosphonium cations with four alkyl groups which may bet he same or different, for example, with butyl, octyl or phenyl groups, are mentioned in the publication of Wasserscheid and Keim cited above.

Nitrogen containing cations are preferred. The invention is explained in further detail in view of this embodiment.

In principle, all known ammonium cations which comprise at least one organic substituent, can be applied. In general, these are primary, secondary, tertiary or quaternary ammonium cations. For example, the substituents can be linear or branched alkyl groups, for example, with 1 to 12 carbon atoms. The alkyl groups at the nitrogen atom can be the same or different. The substituents can likewise be aromatic groups, for example, the phenyl group which, if desired, can be monosubstituted or multiply substituted, for example, by one or more C1 to C3 groups. The substituents can also be arylalkyl groups, for example, benzyl groups. Guanidinium cations and isouronium cations are suitable, too (such compounds are available from Merck, Darmstadt). Substituents at nitrogen atoms, oxygen atoms and sulfur atoms can be linear or branched alkyl groups, for example, with one to 4 carbon atoms, or aryl groups, the nitrogen atoms can also be substituted by hydrogen.

Cyclic saturated ammonium cations are likewise suitable, for example those mentioned in German unexamined publication DE 101 14 565 namely optionally substituted mono or bicyclic saturated ammonium cations, for example, piperidinium or piperidinium substituted by hydroxy groups. Also the cations of bicyclic amines mentioned there especially those of 1,5-diazabicyclo[4.3.0]non-5-ene and 1,8-diazabicyclo[5.4.0]-undec-7-ene, as well as cyclic amines substituted by amino groups like dialkylaminopiperidine and dialkylaminopiperazine (alkyl denotes here C1 to C4) are suitable in the form of cations.

Heterocyclic compounds which comprise at least one nitrogen atom and optionally an oxygen or sulfur atom and are mentioned in said WO 02/074718 on pages 4 to 6, are suitable as cations, too. These are optionally substituted cations based on the structure of pyridine, pyridazine, pyrimidine, pyrazine, imidazole, 1H-pyrazole, 3H-pyrazole, 4H-pyrazole, 1-pyrazoline, 2-pyrazoline, 3-pyrazoline, 1-imidazoline, 2-imidazoline, 4-imidazoline, thiazole, oxazole, 1,2,4-triazole (positive charge on the 2-nitrogen or 4-nitrogen atom, respectively), 1,2,3-triazole (positive charge on the 2-nitrogen or 3-nitrogen atom, respectively) and pyrrolidine. Explanations concerning the substituents are given in WO 02/074718 on pages 6 to 13. Cations of N-alkylisochinoline, alkyltriazolium, or N-alkylimidazoline are likewise suitable. These structures can be substituted by hydrogen. One or more hydrogen atoms can be substituted, for example, by alkyl groups with 1 to 18 carbon atoms (C2-C18 alkyl groups can comprise one or more oxygen or sulfur atoms or imino groups in the chain), by C6 to C12 Aryl groups, by C5 to C12-cycloalkyl or a 5-membered or 6-membered heterocyclic group with oxygen, nitrogen or sulfur atoms. Two of the substituents can form an unsaturated or saturated alkyl or aromatic ring which may comprise one or oxygen atoms, sulfur atoms or imino groups in the chain. These substituents can themselves be substituted by functional groups, aryl, alkyl, aryloxy, alkyloxy, halogen, heteroatoms and/or heterocycles.

C1-C18-alkylcarbonyl, C1-C18-alkyloxycarbonyl, C5-C12-cycloalkylcarbonyl or C6-C12-arylcarbonyl can, for example, be substituents of a nitrogen atom which carries the positive charge; once again, also these substituents can be themselves substituted by functional groups, aryl, alkyl, aryloxy, alkyloxy, halogen, heteroatoms and/or heterocycles.

Cations with such 5-membered or 6-membered rings are preferred in the process of the present invention.

Imidazolium, imidazolinium, pyrazolium, oxatriazolium, thiatriazolium, pyridinium, pyridazinium, pyrimidinium or pyrazinium cations are especially suitable. The carbon atoms can be substituted preferably by hydrogen, C1 to C12 alkyl or by C2 to C12 alkyl substituted by a hydroxy or CN group. The nitrogen atom with the positive charge preferably is substituted by acetyl, methyl, ethyl, propyl or n-butyl substituent. Optionally, it can be substituted, just like further nitrogen atoms in the ring, if present, by hydrogen or C1 to C12 alkyl groups. Methyl, ethyl, propyl and n-butyl are preferred alkyl groups.

Oligomers and polymers which comprise the cations described above (see for example, M. Yoshizawa, W. Ogihara and H. Ohno, Polym. Adv. Technol. volume 13, pages 589-594, 2002) are also applicable, but in the frame of the present invention, monomeric cations are preferred.

Very preferred cations are imidazolium cations which are substituted by one, two or three substituents, each with 1 to 24 carbon atoms; the substituents themselves can be substituted by alkyl and/or aryl groups. Especially preferred cations are 1,3-dimethyl-imidazolium, 1-ethyl-3-methyl-imidazolium, 1-propyl-3-methyl-imidazolium, 1-butyl-3-methyl-imidazolium, 1-pentyl-3-methyl-imidazolium, 1-hexyl-3-methyl-imidazolium, 1-heptyl-3-methyl-imidazolium, 1-octyl-3-methyl-imidazolium, 1-nonyl-3-methyl-imidazolium, 1-decyl-3-methyl-imidazolium, 1-undecyl-3-methyl-imidazolium, 1-dodecyl-3-methyl-imidazolium, 1-benzyl-3-methyl-imidazolium, 1-butyl-2,3-dimethyl-imidazolium. Very suitable are ionic liquids with 1,3-dimethyl-imidazolium, 1-ethyl-3-methyl-imidazolium ("EMIM"), 1-propyl-3-methyl-imidazolium and 1-n-butyl-3-methyl-imidazolium ("BMIM") as cation.

Those anions are very suitable which can form hydrogen bridge bonds. Strongly coordinating anions, for example, alkyl sulfates or aryl sulfates are more suitable than weakly coordinating anions like trifluoromethane sulfonate and especially hexafluorophosphate or tetrafluoroborate, because they provide good purifying results even in a one-step process. The anions of mono- or multibasic oxygen acids or their derivatives like the esters or the amides, for example, sulfonates or sulfonamides, are also suitable. Ionic liquids with the following anions are very suitable: alkylcarboxylates with a total of 2 to 8 carbon atoms, for example, acetate; alkylcarboxylates, substituted by halogen, especially fluorine, for example, trifluoracetate; sulfate; hydrogensulfate; phosphate; hydrogenphosphate; dihydrogenphosphate; alkylsulfate with a C1- to C12 alkyl group which can be linear or branched. Suitable anions are, for example, methyl sulfate, ethyl sulfate, n-propyl sulfate, n-butyl sulfate, up to n-octyl sulfate; alkyl and dialkyl phosphate with one or two C1 to C12 alkyl groups, for example, methyl phosphate, dimethyl phosphate, ethyl phosphate, diethyl phosphate, n-propyl phosphate, di-n-propyl phosphate, n-butyl phosphate, di-n-butyl phosphate; C1-C12 alkylsulfonate, preferably C1-C4 alkylsulfonate, for example, methyl sulfonate, ethyl sulfonate, n-propyl sulfonate, n-butylsulfonate; fluorosulfonate and sulfonates with a C1 to C12 alkyl group substituted by one or more halogen atoms, especially fluorine, for example, trifluormethylsulfonate (triflate); arylsulfonate, for example, tosylate; phosphonate with a C1 to C12 alkyl group which is directly bound to the phosphorous atom, for example, methyl phosphonate, ethyl phosphonate, n-propyl phosphonate, n-butylphosphonate; phosphonate with a C1 to C12 alkyl group, which is substituted by one or more halogen atoms, preferably fluorine, and which is directly bound to the phosphorous atom, for example, trifluoromethylphosphonate; esters of said phosphonates with a C1 to C12 alkyl group which is optionally substituted by one or more halogen atoms, preferably fluorine; imides of bis(C1-C12-alkyl)sulfonate wherein the alkyl groups optionally can be substituted by one or more halogen atoms, preferably fluorine for example, bis(trifluoromethylsulfonyl)imide.

Without the intention to give a scientific explanation, the results indicate that less the polarity of an ionic liquid, but the presence of strongly coordinating anions in the ionic liquid, for example, methylsulfate or ethylsulfate, influence the absorption of HCl, HF or HBr. Weakly coordinating or "noncoordinating" anions (see S. H. Strauss, Chem. Rev. 1993, volume 93, pages 927-942) like, for example, $SO_3CF_3$ and especially $PF_6$ and $BF_4$, where the negative charge is very delocalized, show no especially strong effect in absorbing HCl or HBr. Ionic liquids with the $SO_3F$ anion and/or $SO_3CF_3$ anion are preferred because they are very stable towards HCl and other constituents of the gas mixtures, and the absorbed acid can be desorbed easily which is a technical advantage. A slightly lower affinity towards HCl is compensated here by high stability. If desired, the absorption treatment with ionic liquids which comprise $SO_3F$ anions and/or $SO_3CF_3$ anions is performed twice or more often until the desired degree of HCl depletion is achieved. Other anions, which were identified to be very suitable if used for the removal of weaker acids are the three isomeric tosylate anions (o-toluolsulfonate, m-toluolsulfonate and especially p-toluolsulfonate). Ionic liquids with the tosylate anion can be in liquid or solid form at room temperature. Ionic liquids with the tosylate anion can optionally applied in the form of mixtures with other ionic liquids which lower the melting point (this is also true for other ionic liquids which have a melting point which is higher than desired). Ionic liquids which comprise or consist of a mixture of triflate and tosylate anions, for example, in a molar ratio of 0.1:1 to 10:1, preferably 3:7 bis 7:3, are a good compromise of stability and depleting effectivity and have a suitably low melting point, for example, in the range of 0 to 60° C. "Consisting" from said mixture means that no ionic liquids with anions other than triflate and tosylate are contained.

While all of the anions described above are suitable, they will be applied in the frame of the present invention only so that the acid corresponding to the anion of the respective applied ionic liquid is stronger than the acid to be separated.

In the process of the present invention, ionic liquids can be applied which contain only a single compound. Mixtures of two, three or more different ionic liquids can also be applied. Thus, separation properties can be influenced, for example polarity or the affinity to a compound to be separated; or the viscosity can be influenced or the temperature where the mixture solidifies. The latter is utilized by applying mixtures of 1-ethyl-3-methyl-imidazolium triflate and 1-ethyl-3-methyl-imidazolium-tosylate.

The contact between the gas mixture to be treated and the ionic liquid can be performed according to processes which are common in gas-liquid operations. For example, the gas mixture to be treated can be passed through the ionic liquid; the contact surface can be enhanced by injectors, frits or mixing equipment in the reactor. For example, the process can be performed in a bubble column, column with bubble cap trays or a packed column (with packing bodies). Optionally, the ionic liquid can be immobilized, for example, on a carrier, for example, on ceramic material, or incorporated in a polymer; but this is less preferred.

Pressure is variable in a wide range, for example, it can be between 0.5 and 10 bars, preferably between ambient pressure (1 bar) up to 10 bars (absolute) or even higher. It is technically very simple to perform the process at ambient pressure or slightly higher, e.g., up to 1.5 bars (abs.) to press the gas mixture into the ionic liquid.

The temperature is variable in a wide range, too. Advantageously, temperature is chosen such that the viscosity is in the desired range. Principally, the temperature can be in a range between the decomposition temperature down to the solidification temperature of the ionic liquid or the mixture of ionic liquids, preferably in a range between 200° C. and the solidification temperature. Preferably, the temperature of the ionic liquid is in the range between their solidification temperatures, for example, above 10° C., up to 200° C., very preferably, above 20° C. and 80° C. when it is contacted with the gas mixture which is to be separated. As already mentioned, in principle, a range between solidification temperature and decomposition temperature is possible.

The acid, for example, HCl or HF, is retained in the ionic liquid, and $C(O)F_2$, $PF_5$, acid fluoride or other not absorbed gas constituents pass through the ionic liquid. In case of suitable purity, the gases can be liquefied and used for the respective purpose.

In some gas mixtures, further constituents are comprised which also pass through the ionic liquid. For example, gas mixtures comprising $C(O)F_2$ and HCl from the photochemical oxidation of $CHClF_2$ may contain starting material ($CHClF_2$). Constituents of the gas mixtures which are not retained in the ionic liquid but must be separated, too, can be removed already before passing the mixture through the ionic liquid, for example, they can be removed by fractionated distillation or condensation. Alternatively, they can be left in the gas mixture and then they can be removed after contact with the ionic liquid. Also here, they can be removed by fractionated or a condensation, if desired, with subsequent low temperature distillation. If desired, a pressure distillation to remove low and high boiling substances can be performed after one or even each absorption step. Alternatively, a pressure distillation can be performed before performing the process of the present invention, or after performing it.

The constituents retained in the ionic liquid are desorbed from it physically in a desorption step. Desorption can be performed by a change (rise) of the temperature, pressure and/or passing an inert gas through the ionic liquid, for example, nitrogen or an inert gas, for example, argon. As to the pressure, a pressure lower than that in the absorption step is applied, for example, by applying a vacuum. Additionally, or instead, the temperature is raised above that of the absorption step, for example, to a range between 50 to 300° C. Optionally, two or more of these physical treatments like rising the temperature or applying a vacuum. By desorption and removal of the constituents of the gas mixture from the ionic liquid, the ionic liquid is completely regenerated and used again in the absorption step without any danger that the reaction mentioned above between the anion of the ionic liquid and the acid to be removed takes place. The temperature during desorption preferably is not higher than 100° C., but can be as high as below the decomposition temperature of the ionic liquid. For technical reasons, a vacuum of 100 mbar often is a preferred lower limit. But there are in principle no objections to perform desorption at lower pressures, for example, at 1 mbar or even $10^{-3}$ mbar as successful trials have shown. Desorption is very fast (for example, often within 1 to 2 hours, often also much faster, according to the conditions during desorption like temperature, degree of the vacuum or stirring) even at temperatures at or below 100° C. down to preferably 40° C. Contrary thereto, desorption of sorbed constituents in the process of EP-A 1 394 109 requests heating up to 150° C. and higher for many hours.

It is decisive for desorption by means of a change of pressure that desorption is performed at a pressure lower than the pressure during absorption. If contact between the gas mixture and the ionic liquid is performed at overpressure, for example, at 5 bars (abs) or more, the subsequent desorption can be performed at a pressure which is at or slightly above ambient pressure, for example, in the range of 1 to 1.5 bars (abs). Of course, also here, a vacuum can be applied and optionally, the temperature can be raised to complete reconditioning of the ionic liquid. If desired, the absorbed constituents must not be desorbed completely. It may be sufficient to desorb only substantial parts of absorbed constituents, for example, 80% by weight or more. The desorption can be performed batchwise or continuously.

As described above, after the step of desorption, acid is again separated with the regenerated ionic liquid.

The process according to the present invention concerns a novel separation problem which was not known in the state of the art. It is distinctive from known processes by the fact that inorganic constituents (HCl, HBr, and HF) have to be separated or are involved, that no amines but ionic liquids are applied for their separation and that the ionic liquids are selected such that no reaction occurs between the anions of the ionic liquid and the acid to be separated. The advantage is that HCl, HF and HBr can be separated in a simple manner from other constituents of the gas mixture which are susceptible for hydrolysis, for example, from gaseous carboxylic acid chlorides and carboxylic acid fluorides, especially from phosphorous pentafluoride or $C(O)F_2$, and that the ionic liquid can be applied many times for the sequence of absorption and desorption without solids are precipitated from the ionic liquid. Especially advantageous is the possibility to separate HCl from its mixtures with $C(O)F_2$; such mixtures are obtained due to the preparation process. Here, a clearly better degree of separation is achieved than, for example, according to the process of U.S. Pat. No. 3,253,029 where acetonitrile is used as separating agent. U.S. Pat. No. 4,092,403 is directed to separate gas mixtures comprising HCl and $C(O)F_2$ and HF by means of alumina as adsorbent, but the purpose is to obtain purified HCl, and fluoride values are not described to be desorbable (at least in the form of carbonyl fluoride and HF). According to the present invention, also mixtures can be treated which are obtained in fluorination reactions of phosphorous-chlorine compounds with HF, especially from the preparation of $PF_5$ from phosphorous (III) chlorides or phosphorous (V) chlorides and HF and $Cl_2$ or $F_2$, respectively.

Another object of the present invention relates to purified $CH_3C(O)F$, $CHF_2C(O)F$, $CF_3C(O)F$ or $C_2F_5C(O)F$ and especially purified $C(O)F_2$ and $PF_5$.

Generally, the purified $CH_3C(O)F$, $CHF_2C(O)F$, $CF_3C(O)F$ or $C_2F_5C(O)F$ and especially the purified $C(O)F_2$ and the purified $PF_5$ according to the present invention comprise HCl in an amount of at most 50 ppm by weight, preferably in an amount of at most 15 ppm by weight. The content of HCl can even be lower, down to 10 ppm and even less. $C(O)F_2$ and $PF_5$ are preferred. Preferably, $C(O)F_2$ and $PF_5$ comprise HCl in an amount of equal to or more than 0.5 ppm by weight, preferably in an amount of equal to or more than 1 ppm up to 15 ppm. $PF_5$ is comprised in the purified $PF_5$ an amount of at least 98% by weight, preferably at least 99% by weight.

The purified $C(O)F_2$ according to the present invention may comprise up to 5% by weight of an inert gas, for example, nitrogen, carbon dioxide or a noble gas, for example, argon or helium. The content of $C(O)F_2$ is at least 94.5% by weight. Preferred purified $C(O)F_2$ comprises 94.5 to 99.9% by weight of $C(O)F_2$, 0 to 5% by weight of an inert gas and total acidity, including HCl, in an amount between 1 to 50 ppm, preferably 1 to 15 ppm. Preferably, the content of organic impurities (including COFCl) is less than 1000 ppm, preferably less than 500 ppm; the content of other impurities, for example, air, is less than 1000 ppm. The term "acidity" denotes acidic constituents, mostly in the form of HCl; so, in principle, the acidity essentially corresponds to the content in HCl.

Especially preferred $C(O)F_2$ according to the present invention comprises 99.4% by weight or more of $C(O)F_2$, between 1 and 15 ppm total acidity including HCl, equal to or less than 0.5% by weight of inert gas (including $CO_2$), less than 50 ppm of organic impurities (including COFCl) and less than 150 ppm of other impurities, e.g. air. Purified $C(O)F_2$ in such a pure state was not achievable by processes of the state of the art. It could not be expected that such a pure carbonyl fluoride could be achieved by the process of the invention.

The purified compounds mentioned above, especially the purified carbonyl fluoride, are obtainable by repeated treatment with ionic liquids as described above. The number of absorption steps depends on the degree of contamination of the raw gas. As described in one example, six consecutive steps of treatment in a two-step absorption, followed by desorption, is sufficient to purify even extremely contaminated carbonyl fluoride.

The following examples are intended to further explain the invention without limiting it.

EXAMPLES

General Procedure:

For the following examples, a test gas mixture was applied which was prepared for the examples and comprises only two constituents to be separated from each other, namely $C(O)F_2$ and HCl in a volume/volume ratio of 2:1.

The term "tosylate" in the examples always denotes p-tosylate, "triflate" denotes trifluoromethansulfonate $CF_3SO_3$—.

Example 1 (Comparison Example)

Removal of HCl from its Mixture with $C(O)F_2$ Using 1-ethyl-3-methyl-imidazoliumtrifluormethane sulfonate (EMIM-Triflate) and 1-ethyl-3-methyl-imidazoliumtoluenesulfonate (EMIM-Tosylate) at 25° C.

Sorption step: 1200 g EMIM-Triflate and EMIM-Tosylate were applied in a molar ratio of 1:1 and possibly present water was removed. 800 g of the gas mixture to be separated was passed into the ionic liquid. HCl was absorbed, $C(O)F_2$ passed through the liquid. Shortly after introducing the gas mixture into the liquid, the ionic liquid which initially was clear turned cloudy. After the introduction of the gas mixture had ended, a white solid precipitated. Its volume corresponded to about 2% of the volume of the ionic liquid.

Desorption step: HCl absorbed by the ionic liquid in the absorption step was desorbed in a vacuum under heating.

Raising the temperature of the ionic liquid to 80° C. caused the dissolution of the precipitate; during cooling, it precipitated again. The melting point of EMIM-chloride is 79° C. So it is assumed that this compound which is not effective for HCl absorption had formed from a part of the ionic liquid which had been applied for the separation.

The ionic liquid was used several times for absorption and desorption and was analyzed by ion chromatography. In the beginning, the chloride content was lower than the detection limit by ion chromatography. After the fourth repetition, the chloride content was 4%. The enrichment in chloride ions can be explained by an anion exchange in the EMIM-Tosylate by chloride and removal from the equilibrium of 4-methyl benzoic acid which forms.

Example 2 (According to the Present Invention)

Reversible Removal of HCl from $C(O)F_2$ by Means of EMIM-trifluoromethansulfonate The mixture of $C(O)F_2$ and HCl (volume ratio 2:1) was passed through 1200 g of EMIM-triflate. In total, 6000 g of the mixture was passed through the separating agent in 10 absorption/desorption steps whereby HCl was selectively sorbed. After each absorption/desorption cycle, a sample of the ionic liquid was analyzed for chloride by ion chromatography. Always, and until the end of introducing the gas mixture into the ionic liquid, the chloride content was below the detection limit. This demonstrates that HCl which is the weaker acid compared with trifluoromethanesulfonic acid, can be absorbed completely reversibly by ionic liquids which comprise the triflate group as anion.

Example 3

Preparation of Ultrapure Carbonyl Fluoride, $C(O)F_2$

General Procedure:

In each absorption step, the carbonyl fluoride to be purified was passed through two absorption towers. The pressure was kept in the range of 1100 to 1300 mbar at 10 to 40° C. and a EMIM-triflate feed of 20 l/h.

Desorbtion: Desorption was performed at a pressure range from 100 to 300 mbar at 50 to 200° C. and a EMIM-triflate feed of 40 l/h.

Pressure distillation: After each of the first to the fourth absorption step, the gases leaving the absorption step were treated in two pressure columns at a pressure between 20 and 60 bars, to remove inert gases and high-boiling impurities, and then stored in a pressure bottle before passed to the next purification step. This intermediate treatment caused sometimes differences in the analysis data.

The carbonyl fluoride leaving the sixth absorption step was treated in one pressure column at 15 to 25 bars to remove residual carbonyl chlorofluoride and then was filled into pressure bottles for storage.

First Purification Step:
Raw gas composition (percentages given in weight-%): 49% $COF_2$, 41% HCl, 9% high boiling compounds, balance to 100%: inert gases
  Feed: 2 to 2.5 kg/h
  Total amount treated: 260 kg
  Composition of gas after treatment: 93.7% $COF_2$, 6.1% HCl, balance to 100%: Inert gases and COFCl
  Amount of gas after treatment: 152 kg
  Depletion of HCl: 91.3%
Then, a pressure distillation was performed, and the gas leaving the pressure distillation was stored in a pressure bottle before the next step.

Second Purification Step
The gas composition obtained in the first purification step was applied as feed gas.
  Feed: 1.6 to 2.2 kg/h
  Total amount treated: 152 kg
  Composition of gas after treatment: 99.21% $COF_2$, 0.62% HCl, balance to 100%: Inert gases and COFCl
  Amount of gas after treatment: 120.2 kg
  Depletion of HCl: 91.9%
Then, a pressure distillation was performed, and the gas leaving the pressure distillation was stored in a pressure bottle before the next step.

Third Purification Step
The gas composition of the second purification step was applied as feed gas.
  Composition: 98.78% $COF_2$, 0.70% HCl, 0.33% COFCl; balance to 100%: Inert gases
  Feed: 1.6 to 2.2 kg/h
  Total amount treated: 118.2 kg
  Composition of gas after treatment 99.73% $COF_2$, 0.06% HCl, 0.02% COFCl, balance to 100%: Inert gases
  Amount of gas after treatment: 85.8 kg
  Depletion of HCl: 93.8%
Then, a pressure distillation was performed, and the gas leaving the pressure distillation was stored in a pressure bottle before the next step.

Fourth Purification Step
The gas composition obtained in the third purification step was applied as feed gas.
  Composition: 99.63% $COF_2$, 0.10% HCl, 0.10% COFCl, balance to 100%: Inert gases
  Feed: 1.6 to 2.2 kg/h
  Total amount treated: 84.50 kg
  Composition of gas after treatment: 99.76% $COF_2$, 0.01% HCl, 0.02% COFCl, balance to 100%: Inert gases
  Amount of gas after treatment: 67.79 kg
  Depletion of HCl: 91.9%
Then, a pressure distillation was performed, and the gas leaving the pressure distillation was stored in a pressure bottle before the next step.

Fifth Purification Step
The gas composition obtained in the fourth purification step was applied as feed gas.
  Composition: 99.69% $COF_2$, 0.01% HCl, 0.03% COFCl, balance to 100%: Inert gases
  Feed: 1.6 to 2.2 kg/h
  Amount treated: 66.54 kg
  Composition of gas after treatment: 99.64% $COF_2$, <100 ppm HCl, 0.04% COFCl, balance to 100%: Inert gases
  Amount of gas after treatment: 58.45 kg
  Depletion of HCl: 91.2%
The gas was then stored in a pressure bottle.

Sixth Purification Step
  Composition of gas after treatment: 99.58% $COF_2$, <100 ppm HCl, 0.04% COFCl, balance to 100%: Inert gases
  Feed: 1.6 to 2.2 kg/h
  Amount treated: 57.03 kg
  Composition of gas after treatment: 99.52% $COF_2$, <15 ppm HCl, 0.04% COFCl, balance to 100%: Inert gases
  Amount of gas after treatment: 50.68 kg
  Depletion of HCl: more than 85%.
The carbonyl fluoride obtained in the sixth purification step was then subjected to a pressure distillation. After this treatment, the analysis gave a content of
  Inert gases: <500 ppm
  $CO_2$: <5000 ppm
  $COF_2$: >99.4%
  COFCl: <50 ppm
  HCl: <10 ppm
In example 3, a pressure distillation was performed after the first four steps. Instead, a pressure distillation could be performed as a first treatment step, or after the last absorption step.

What is claimed is:

1. A purified carbonyl fluoride gas, comprising
$C(O)F_2$ in an amount of at least 94.5% by weight,
HCl in an amount of at most 50 ppm by weight, and
further comprising an inert gas in an amount up to 5% by weight, wherein said inert gas includes carbon dioxide, nitrogen, or a noble gas, or further comprising organic impurities in an amount of less than 1000 ppm, wherein said organic impurities include COFCl.

2. The purified gas according to claim 1, comprising more than 0.5 ppm HCl.

3. The purified gas according to claim 1, comprising from 1 to 50 ppm HCl.

4. The purified gas according to claim 1, comprising from 1 to 15 ppm HCl.

5. The purified gas according to claim 1, comprising from 94.5 to 99.9% by weight of $C(O)F_2$, said inert gas, and a total acidity, including HCl, in an amount between 1 to 50 ppm.

6. The purified gas according to claim 1, comprising 99.4% by weight or more of $C(O)F_2$, between 1 and 15 ppm of total acidity including HCl, equal to or less than 0.5% by weight of said inert gas, less than 50 ppm of said organic impurities, and less than 150 ppm of other impurities.

7. The purified gas according to claim 6, wherein the inert gas includes carbon dioxide.

8. The purified gas according to claim 1, further comprising said organic impurities with a content of less than 1000 ppm.

9. The purified gas according to claim 1, further comprising said organic impurities with a content of less than 500 ppm.

10. A method for etching a semiconductor or for cleaning a Chemical Vapor Deposition chamber, comprising applying the purified carbonyl fluoride gas according to claim 1 as etching gas.

11. The method according to claim 10, wherein the purified carbonyl fluoride gas comprises from 1 to 50 ppm HCl.

12. The method according to claim 10, wherein the purified carbonyl fluoride gas comprises from 1 to 15 ppm HCl.

13. The method according to claim 10, wherein the purified carbonyl fluoride gas comprises from 94.5 to 99.9% by weight of $C(O)F_2$, said inert gas, and a total acidity, including HCl, in an amount between 1 to 50 ppm.

14. The method according to claim 10, wherein the purified gas comprises 99.4% by weight or more of $C(O)F_2$, comprises between 1 and 15 ppm of total acidity including HCl, comprises equal to or less than 0.5% by weight of said inert gas, comprises said organic impurities with a content of less than 50 ppm, and less than 150 ppm of other impurities.

15. The method according to claim 10, wherein the purified gas comprises said organic impurities with a content of less than 500 ppm.

* * * * *